United States Patent [19]

Schweinsberg

[11] Patent Number: 4,884,885

[45] Date of Patent: Dec. 5, 1989

[54] MICROFILM APERTURE CARD, IN PARTICULAR CAMERA CARD

[75] Inventor: Dieter K. J. Schweinsberg, Lautertal, Fed. Rep. of Germany

[73] Assignee: Datox Organisation D. Schweinsberg GmbH & Co. KG, Rodental, Fed. Rep. of Germany

[21] Appl. No.: 113,558

[22] Filed: Oct. 27, 1987

[30] Foreign Application Priority Data

Dec. 16, 1986 [DE] Fed. Rep. of Germany ........ 3642954

[51] Int. Cl.⁴ .............................................. G03B 31/00
[52] U.S. Cl. .................... 353/120; 40/159.2; 353/19
[58] Field of Search ............................ 353/120, 15–19; 355/75, 77; 40/152.2, 158 B, 159.2; 360/2

[56] References Cited

U.S. PATENT DOCUMENTS

| | | | |
|---|---|---|---|
| 1,967,534 | 7/1934 | McClean | 40/159.2 |
| 2,120,673 | 6/1938 | Meadows | 40/159.2 X |
| 2,252,632 | 8/1941 | Jones | 40/158 B |
| 2,587,022 | 2/1952 | Langan | 40/159.2 X |
| 3,354,568 | 11/1967 | Koschier | 40/159.2 |
| 3,626,618 | 12/1971 | Tone et al. | 40/158 B |
| 3,717,407 | 2/1973 | Dimitracopoulos | 353/120 |
| 3,773,511 | 11/1973 | Anderson | 40/158 B X |
| 3,879,117 | 4/1975 | Damlamian | 353/19 |
| 3,883,238 | 5/1975 | Dimitracopoulos | 353/120 X |
| 3,921,318 | 11/1975 | Calavetta | 40/158 B X |
| 3,972,613 | 8/1976 | Plumadore | 355/75 |
| 4,405,228 | 9/1983 | Muscoplat | 353/120 X |

FOREIGN PATENT DOCUMENTS

| | | |
|---|---|---|
| 1045122 | 11/1958 | Fed. Rep. of Germany ........ 353/19 |
| 2358305 | 6/1975 | Fed. Rep. of Germany . |
| 1074930 | 4/1954 | France ............................... 40/159.2 |

OTHER PUBLICATIONS

IBM Tech. Disc. Bull., vol. 19, #12, 5/77, Portable Personal Med. History File, L. W. Comeau.

*Primary Examiner*—Harry N. Haroian
*Attorney, Agent, or Firm*—Balogh, Osann, Kramer, Dvorak, Genova & Traub

[57] ABSTRACT

A microfilm aperture card having a window for mounting a microfilm, and an adhesive tape which extends around the opening in the card, and covering the edges of the microfilm and the window opening, the adhesive tape being adapted to carry identification indicia.

18 Claims, 1 Drawing Sheet

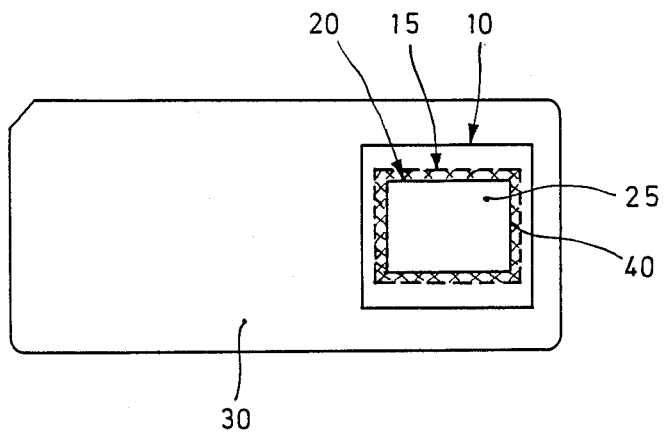

MICROFILM APERTURE CARD, IN PARTICULAR CAMERA CARD

DESCRIPTION

For storing information demagnifications of 20 to about 40 times are usual. Demagnified are mainly documents, written matter and drawings, in order to reduce the space requirement of the document storage and the drawing register. Space savings of up to 98% are possible. Valuable documents and drawings can be stored economically in fire-proof manner and this avoids handling the large-sized originals. Data carriers storing information are of magnetic inductive and in particular of optical type.

For this purpose the microfilm aperture card has established itself. Microfilms are inserted into cutouts of aperture cards. On the basis of the particulars perforated into the cards the films can be mechanically sorted and picked out, for example microfilms of technical drawings by the drawing number of patent documents by the grant number or the like.

Present day microfilm aperture cards carry a cutout or a window with a frame. For securing for example the film negative cut from a film roll said negative in a so-called camera card is secured after withdrawal of protective paper for example against an adhesive border. In addition there are microfilm aperture cards of a great variety of types, inter alia including those with stuck-on film.

Hitherto, a film was exposed with the camera, in particular a roll film; after development the films were cut, a masking paper or protective paper withdrawn from the adhesive frame and the film card or generally a data carrier was printed whilst observing standards. The invention deals in particular with adhesive tapes which extend into the window cutout. Inter alia, camera cards exist which are intended for reenlargements to be made therefrom.

With both cards there is a problem of the films being adhered with transparent adhesive tapes.

The transparent adhesive tape (the actual image is centered within the film) overlapping for various reasons the cardboard cards and the film necessarily resulted in black edges in the reenlargements. In addition, the head of the camera applying the film to make the exposure was always visible in the negative and thus in the print.

However, when reading the film as well without reenlargement the observer was always dazzled by the film (now irradiating white light).

This is where the invention comes in.

The problem underlying the invention, in particular in film aperture cards, generally in data carriers, is to avoid that in reading or reenlargement a border troublesome to the eye is present round the film.

According to the invention this is avoided surprisingly simply in that with a microfilm aperture card consisting of mounting card, a cutout in said mounting card, an adhesive tape running round the window cutout and a microfilm adhered to the adhesive tape, the adhesive tape is opaque or nontransparent.

This achieves that on reenlargement a white edge and not a black edge is present and when reading the microfilm card in the reading magnifying device there is no bright edge which troubles the eyes and thus makes the content difficult to recognize.

According to a preferred embodiment of the invention the adhesive tape is metallized.

In addition, the adhesive tape itself can carry information, for example magnetic information.

For an optical scanning the adhesive tape can be coated and reflective. The adhesive tape may itself carry optical information.

According to an optional embodiment the adhesive tape may carry inductively readable information.

The step according to the invention can be applied generally to magnetic data carriers and magnetic foils. The magnetic tape is coated with an iron-containing substance for magnetic scanning.

For an optical scanning adhesive tapes coated with aluminum are employed.

The metallic or metallized adhesive tape frame or border may be used as information carrier for counting purposes, coding purposes, etc.

This feature is also employed in duplicated cards or diazo cards.

A considerable saving of toner is achieved because the edge no longer need be developed and the toner need not creep into said regions where of course most toner is used.

Reenlargements with black edges are thus avoided.

The completely opaque adhesive tapes leave on reenlargement a white edge and do not consume any toner whatever.

The previous radiating of the white edge in the reading device similar to that in a luminescent tube is avoided. The information content can be recognized without difficulty. This can be used with all possible data carriers with mounted films, in particular film aperture cards.

An addition advantage results in the storage and transport and manipulation. Hitherto, it was not possible to avoid the films becoming charged up in the film aperture cards. At the latest in the processing machines discharges resulted which considerably impaired the quality of the enlargements. The energy is now electrostatically dissipated so that no flash discharges are to be expected. Thus, a quasi neutralization takes place electrically.

Apart from counting purposes the feature according to the invention has further uses. For example, the camera can scan whether a card is present therein or not. This is possible via the information contained in the metallized adhesive frame.

Finally, it is possible to accommodate in the adhesive frame information indicating to the user that he has inserted an unsuitable read card, i.e. one for which a reenlargement is unlikely to be successful. The optical system when reading the film aperture card is optimum, whether the original or the enlargement.

An example of embodiment of the invention will now be described in detail with reference to the enclosed drawing. This drawing shows an aperture card 30, for example of cardboard, a window cutout in the microfilm aperture card 15, the outer border of the microfilm mounting at 20 and the metallized adhesive tape at 40.

After withdrawing a protective film the microfilm image 25 can be pressed in or adhered against the adhesive frame or border so that the standard conditions (the thickness of the aperture card including the microfilm with its mounting must not exceed the thickness of the aperture card by more than 0.006 with microfilm aperture cards with adhesive frame) are observed.

I claim:

1. A microfilm aperture card, in particular a camera card, comprising a cardboard, an aperture cut-out in the cardboard to provide a window, an adhesive tape extending around the periphery of said window, said tape having an outer peripheral portion secured to one side of said cardboard around the periphery of said window, said tape having an inner peripheral portion defining an adhesive exposed inner window for the reception of a microfilm, whereby said outer peripheral portion of said tape defines a frame about said window and said inner portion of said tape defines a frame on the inside of the periphery of said window, said tape being opaque to provide an opaque border about said microfilm and said tape itself carries information.

2. Microfilm aperture card according to claim 1, characterized in that for optical scanning the adhesive tape is reflectingly coated.

3. Microfilm aperture card according to claim 2, characterized in that for optical scanning the adhesive tape itself carries optical information.

4. Microfilm aperture card according to claim 1, characterized in that the metallized adhesive tape carries inductively readable information.

5. Microfilm aperture card according to claim 1, wherein said adhesive tape is incorporated in magnetic data carriers and magnetic foils.

6. Microfilm aperture card according to claim 5, characterized in that the adhesive tape is coated for the magnetic scanning with an iron-containing substance.

7. Microfilm aperture card according to claim 6, characterized in that for optical scanning the adhesive tape is coated with aluminum.

8. Microfilm aperture card according to claim 1, characterized in that the adhesive tape border is metallized and serves as information carrier for counting purposes, coding purposes and other purposes.

9. Microfilm aperture card as claimed in claim 1, characterized in that the adhesive tape itself carries information.

10. Microfilm aperture card as claimed in claim 1, characterized in that for optical scanning the adhesive tape is reflectingly coated.

11. Microfilm aperture card as claimed in claim 1, characterized in that the metallized adhesive tape carries inductively readable information.

12. Microfilm aperture card according to claim 1, wherein said adhesive tape is incorporated in magnetic data carriers and magnetic foils.

13. Microfilm aperture card according to claim 4, wherein said adhesive tape is incorporated in magnetic data carriers and magnetic foils.

14. Microfilm aperture card according to claim 5, wherein said adhesive tape is incorporated in magnetic data carriers and magnetic foils.

15. Microfilm aperture card according to claim 6, wherein said adhesive tape is incorporated in magnetic data carriers and magnetic foils.

16. Microfilm aperture card according to claim 7, characterized in that the metallized adhesive tape border serves as information carrier for counting purpose, coding purposes and other purposes.

17. Microfilm aperture card according to claim 8, characterized in that the metallized adhesive tape border serves as information carrier for counting purposes, coding purposes and other purposes.

18. Microfilm aperture card according to claim 8, wherein said adhesive tape is fully metallized.

* * * * *